(12) United States Patent
Vasseur et al.

(10) Patent No.: US 9,160,760 B2
(45) Date of Patent: Oct. 13, 2015

(54) ANOMALY DETECTION IN A COMPUTER NETWORK

(71) Applicant: Cisco Technology, Inc., San Jose, CA (US)

(72) Inventors: Jean-Philippe Vasseur, Saint Martin d'Uriage (FR); Javier Cruz Mota, Assens (CH); Andrea Di Pietro, Lausanne (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/164,475

(22) Filed: Jan. 27, 2014

(65) Prior Publication Data

US 2015/0195296 A1    Jul. 9, 2015

Related U.S. Application Data

(60) Provisional application No. 61/923,847, filed on Jan. 6, 2014.

(51) Int. Cl.
*G06F 17/18* (2006.01)
*H04L 29/06* (2006.01)

(52) U.S. Cl.
CPC .................................. *H04L 63/1425* (2013.01)

(58) Field of Classification Search
CPC .............................. H04L 63/14; G06F 17/18
See application file for complete search history.

(56) References Cited

U.S. PATENT DOCUMENTS

| 7,526,806 B2 | 4/2009 | Wiley et al. |
|---|---|---|
| 7,603,709 B2 | 10/2009 | Lewis et al. |
| 7,657,940 B2 | 2/2010 | Portolani et al. |
| 7,675,926 B2 | 3/2010 | Olsen et al. |
| 7,694,335 B1 | 4/2010 | Turner et al. |
| 7,733,798 B2 | 6/2010 | White et al. |
| 7,779,471 B2 | 8/2010 | Balasubramaniyan et al. |
| 7,793,138 B2 | 9/2010 | Rastogi et al. |
| 7,854,000 B2 | 12/2010 | Venkat et al. |
| 7,971,256 B2 | 6/2011 | Bhikkaji et al. |

(Continued)

FOREIGN PATENT DOCUMENTS

| EP | 2442525 A1 | 4/2012 |
|---|---|---|
| WO | WO-02/48959 A2 | 6/2002 |

OTHER PUBLICATIONS

Cai, et al., "Distributed Aggregation Algorithms with Load-Balancing for Scalable Grid Resource Monitoring", Parallel and Distributed Processing Symposium, Mar. 2007, 10 pages, Institute of Electical and Electronics Engineers.

(Continued)

*Primary Examiner* — Josnel Jeudy
(74) *Attorney, Agent, or Firm* — Parker Ibrahim & Berg LLC; James M. Behmke; Kenneth J. Heywood

(57) ABSTRACT

In one embodiment, a training request is sent to a plurality of nodes in a network to cause the nodes to generate statistics regarding unicast and broadcast message reception rates associated with the nodes. The statistics are received from the nodes and a statistical model is generated using the received statistics and is configured to detect a network attack by comparing unicast and broadcast message reception statistics. The statistical model is then provided to the nodes and an indication that a network attack was detected by a particular node is received from the particular node.

20 Claims, 12 Drawing Sheets

(56) References Cited

U.S. PATENT DOCUMENTS

| | | | |
|---|---|---|---|
| 8,032,779 B2 | 10/2011 | Clemm et al. | |
| 8,121,024 B1 | 2/2012 | Natarajan et al. | |
| 8,161,554 B2 | 4/2012 | Sadhasivam et al. | |
| 8,230,498 B2 | 7/2012 | Shaffer et al. | |
| 8,261,355 B2 | 9/2012 | Rayes et al. | |
| 8,312,541 B2 | 11/2012 | Levy-Abegnoli et al. | |
| 8,619,576 B2 | 12/2013 | Vasseur et al. | |
| 8,634,316 B2 | 1/2014 | Rosenberg et al. | |
| 2004/0264371 A1* | 12/2004 | Chen | 370/229 |
| 2006/0251071 A1* | 11/2006 | Oh et al. | 370/390 |
| 2008/0083029 A1 | 4/2008 | Yeh et al. | |
| 2008/0148342 A1 | 6/2008 | Aiyagari et al. | |
| 2008/0178293 A1* | 7/2008 | Keen et al. | 726/23 |
| 2008/0189774 A1* | 8/2008 | Ansari et al. | 726/7 |
| 2009/0254589 A1* | 10/2009 | Nair et al. | 707/201 |
| 2011/0258702 A1 | 10/2011 | Olney et al. | |
| 2012/0023572 A1 | 1/2012 | Williams, Jr. et al. | |
| 2012/0026938 A1 | 2/2012 | Pandey et al. | |
| 2012/0155475 A1 | 6/2012 | Vasseur et al. | |
| 2012/0210435 A1* | 8/2012 | Niemela | 726/26 |
| 2012/0230204 A1 | 9/2012 | Vasseur et al. | |
| 2012/0255019 A1* | 10/2012 | McNamee et al. | 726/24 |
| 2012/0320923 A1 | 12/2012 | Vasseur et al. | |
| 2013/0010610 A1 | 1/2013 | Karthikeyan et al. | |
| 2013/0024560 A1 | 1/2013 | Vasseur et al. | |
| 2013/0159479 A1 | 6/2013 | Vasseur | |
| 2013/0159548 A1 | 6/2013 | Vasseur et al. | |
| 2013/0179538 A1 | 7/2013 | Dutta et al. | |
| 2013/0219046 A1 | 8/2013 | Wetterwald et al. | |
| 2013/0254631 A1* | 9/2013 | Luby et al. | 714/776 |
| 2013/0276114 A1 | 10/2013 | Friedrichs et al. | |
| 2013/0298184 A1 | 11/2013 | Ermagan et al. | |
| 2014/0022906 A1 | 1/2014 | Vasseur et al. | |
| 2014/0025945 A1 | 1/2014 | McGrew et al. | |

OTHER PUBLICATIONS

Hwang, et al., "DHT-Based Security Infrastructure for Trusted Internet and Grid Computing", International Journal of Critical Infrastructures, vol. 2, No. 4, Nov. 2009, pp. 412-433, Inderscience Publishers.

Jover, R.P., "Security Attacks Against the Availability of LTE Mobility Networks: Overview and Research Directions", 16th International Symposium on Wireless Personal Multimedia Communications (WPMC), Jun. 2013, 9 pages, Atlantic City, NJ.

Lippmann, et al., "Analysis and Results of the 1999 DARPA Off-Line Intrusion Detection Evaluation", Proceedings of the Third International Workshop on Recent Advances in Intrusion Detection, RAID, (2000), pp. 162-182, Springer-Verlag, London, UK.

Oh, et al., "Distributed Learning in Mobile Sensor Networks Using Cross Validation" 49th IEEEE Conference on Decision and Control, Dec. 2010, 6 pages, Institute of Electrical and Electronics Engineers, Atlanta, GA.

Ryan, et al., "Intrusion Detection with Neural Networks", Technical Report WS-97-07, (1997), pp. 72-77, Association for the Advancement of Artificial Intelligence.

Sommer, R., "Outside the Closed World: On Using Machine Learning for Network Intrusion Detection", IEEE Symposium on Security and Privacy, May 2010, pp. 305-316, Intitute of Electrical and Electronics Engineers, Oakland, CA.

Vasseur et al., "Computer Network Anomaly Training and Detection Using Artificial Neural Networks", U.S. Appl. No. 61/923,847, filed Jan. 6, 2014, 166 pgs., U.S. Patent and Trademark Office, Alexandria, Virginia.

Vasseur, et al., "Routing Metrics Used for Path Calculation in Low-Power and Lossy Networks", Request for Comments 6551, Mar. 2012, 30 pages, Internet Engineering Task Force Trust.

Viola, et al. "Rapid Object Detection Using a Boosted Cascade of Simple Features", Proceedings of the 2001 IEEE Computer Vision and Pattern Recognition, vol. 1, (2001), 8 pages, Institute of Electical and Electronics Engineers.

Winter, et al., "RPL: IPv6 Routing Protocol for Low-Power and Lossy Networks", Request for Comments 6550, Mar. 2012, 157 pages, Internet Engineering Task Force Trust.

Zinkevic, et al., "Parallelized Stochastic Gradient Descent", Proceedings of the Advances in Neural Information Processing Systems 23 (2010), 37 pages.

\* cited by examiner

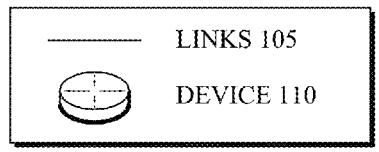
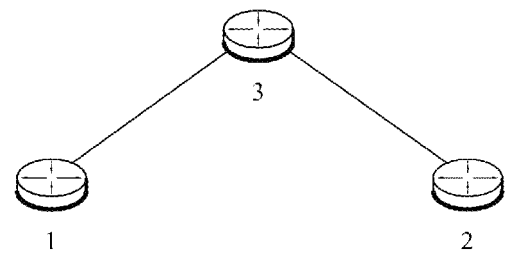
FIG. 5A
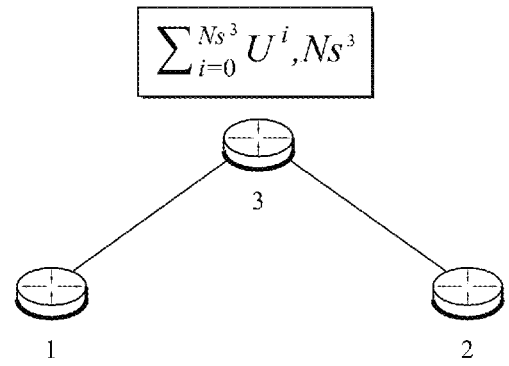
FIG. 5B

ANOMALY DETECTION IN A COMPUTER NETWORK

RELATED APPLICATIONS

This application claims priority to U.S. Provisional Application No. 61/923,847, filed Jan. 6, 2014, entitled: COMPUTER NETWORK ANOMALY TRAINING AND DETECTION USING ARTIFICIAL NEURAL NETWORKS, by Vasseur, et al., the contents of which are herein incorporated by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and performance indicators), and recognize complex patterns in these data. In general, these patterns are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, and association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The ML algorithm then consists in adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

Learning Machines (LMs) are computational entities that rely on one or more ML techniques for performing a task for which they have not been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5F illustrate an example of network statistics being aggregated.

DESCRIPTION OF EXAMPLE EMBODIMENTS

Overview

Figure 1:
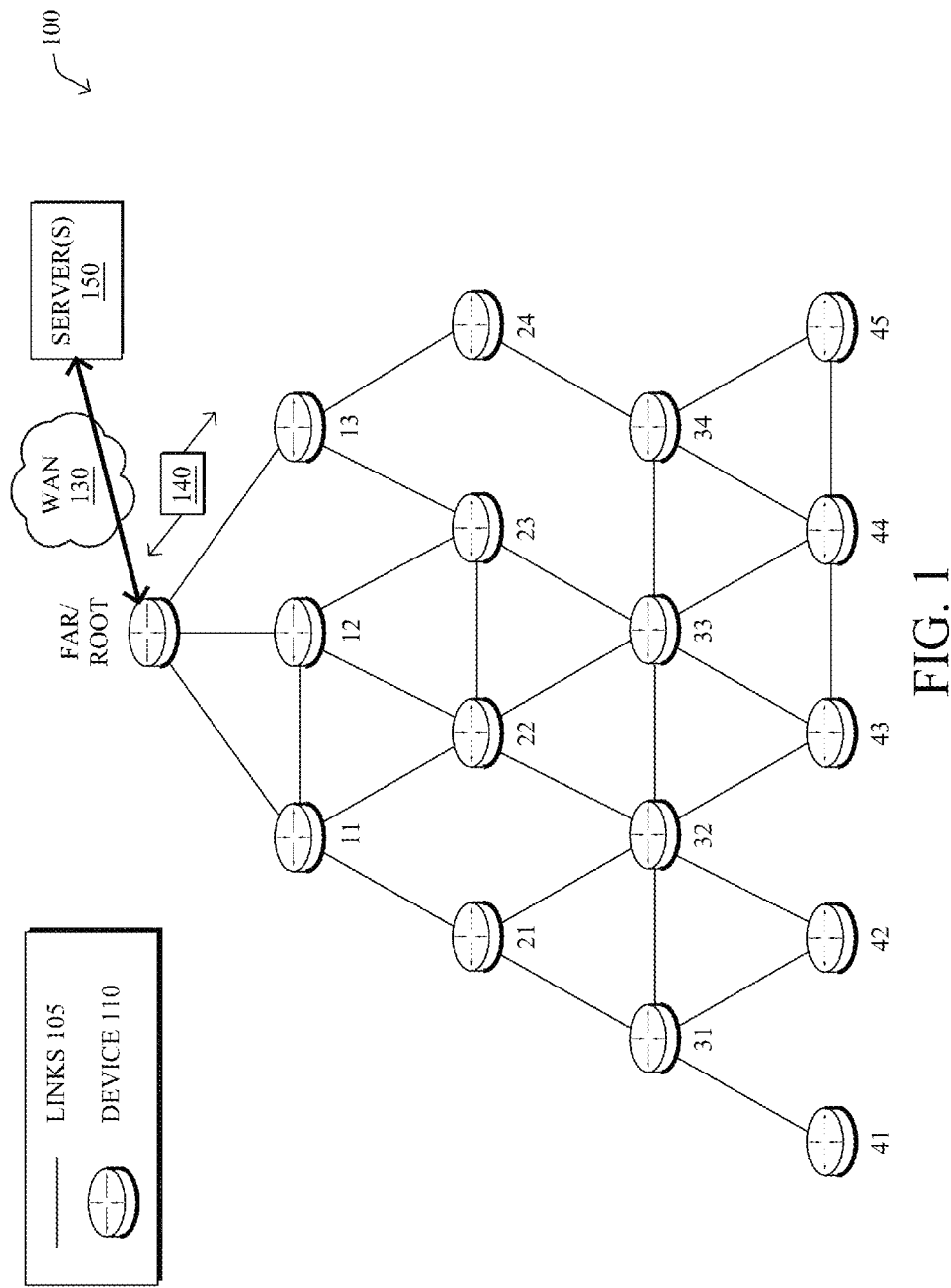
FIG. 1 illustrates an example communication network.

According to one or more embodiments of the disclosure, a training request is sent to a plurality of nodes in a network to cause the nodes to generate statistics regarding unicast and broadcast message reception rates associated with the nodes. The statistics are received from the nodes and a statistical model is generated using the received statistics and is configured to detect a network attack by comparing unicast and broadcast message reception statistics. The statistical model is then provided to the nodes and an indication that a network attack was detected by a particular node is received from the particular node.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications), temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
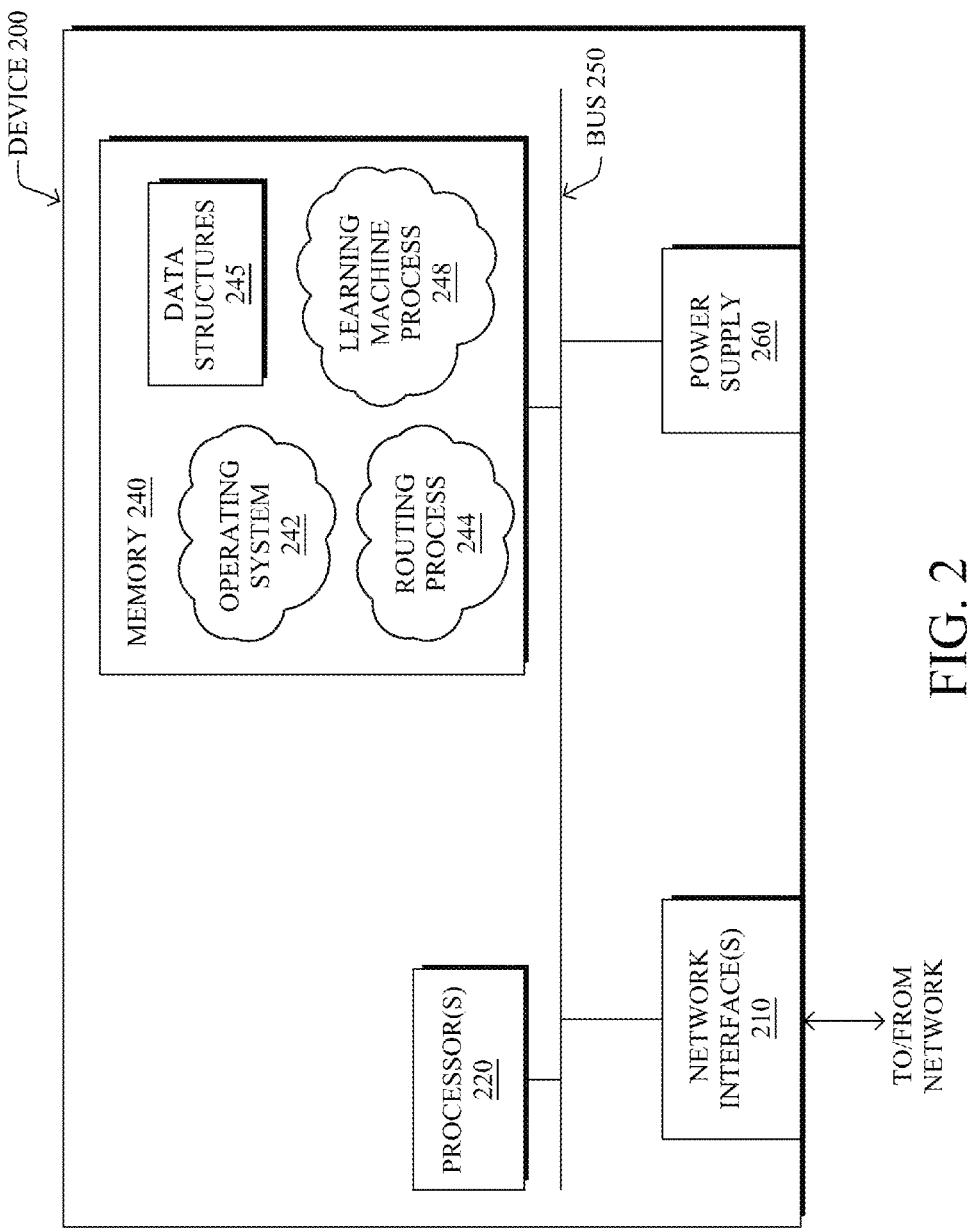
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating systems 242, portions of which are typically resident in memory 240 and executed by the processor, functionally organizes the device by, inter alia, invoking operations in support of software processes and/or services executing on the device. These software processes and/or services may comprise routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols, as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnects are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward, and terminating at, one or more root nodes (e.g., "clusterheads" or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
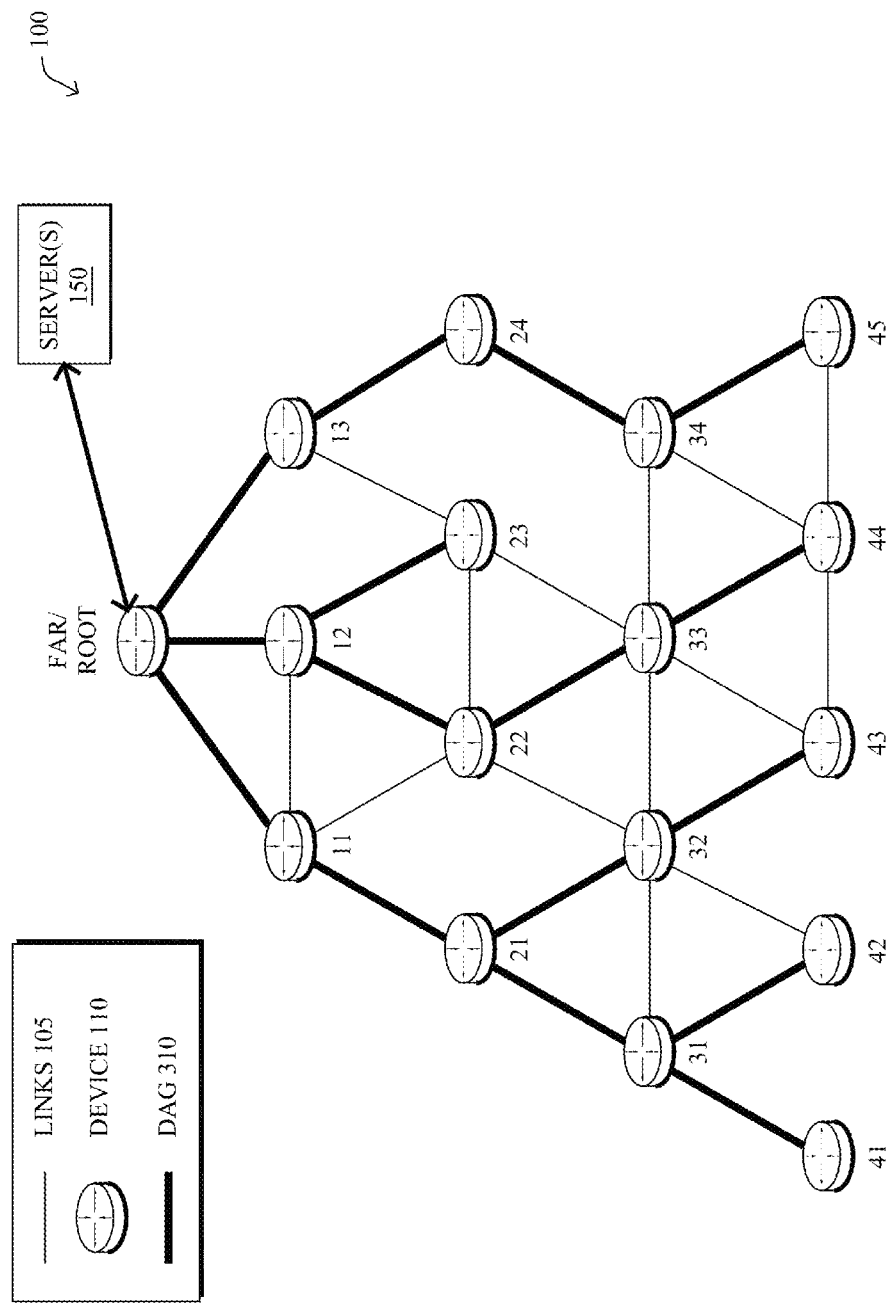
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

RPL supports two modes of operation for maintaining and using Downward routes:

1) Storing Mode: RPL routers unicast DAO messages directly to their DAG Parents. In turn, RPL routers maintain reachable IPv6 addresses for each of their DAG Children in their routing table. Because intermediate RPL routers store Downward routing state, this mode is called Storing mode.

2) Non-Storing Mode: RPL routers unicast DAO messages directly to the DAG Root. The DAO message also includes the IPv6 addresses for the source's DAG Parents. By receiving DAO messages from each RPL router in the network, the DAG Root obtains information about the DAG topology and can use source routing to deliver datagrams. Unlike Storing mode, intermediate RPL routers in Non-Storing mode do not maintain any Downward routes.

Learning Machine Technique(s)

As noted above, machine learning (ML) is concerned with the design and the development of algorithms that take as input empirical data (such as network statistics and performance indicators), and recognize complex patterns in these data. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely on one or more ML algorithms for performing a task for which they have not been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficient management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

Artificial Neural Networks (ANNs) are a type of machine learning technique whose underlying mathematical models were inspired by the hypothesis that mental activity consists primarily of electrochemical activity between interconnected neurons. ANNs are sets of computational units (neurons) connected by directed weighted links. By combining the operations performed by neurons and the weights applied by their links, ANNs are able to perform highly non-linear operations on their input data.

The interesting aspect of ANNs, though, is not that they can produce highly non-linear outputs of the input. The truly interesting aspect is that ANNs can "learn" to reproduce a predefined behavior through a training process. This capacity of learning has allow the successful application of ANNs to a wide variety of learning problems, such as medical diagnostics, character recognition, data compression, object tracking, autonomous driving of vehicles, biometrics, etc.

Learning in ANNs is treated as an optimization problem where the weights of the links are optimized for minimizing a predefined cost function. This optimization problem is computationally very expensive, due to the high number of parameters to be optimized, but thanks to the backpropagation algorithm, the optimization problem can be performed very efficiently. Indeed, the backpropagation algorithm computes the gradient of the cost function with respect to the weights of the links in only one forward and backward pass throw the ANN. With this gradient, the weights of the ANN that minimize the cost function can be computed.

Denial of service (DoS) is a broad term for any kind of attack aiming at, by any means, making a particular service unavailable (be it a certain application running on a server or network connectivity itself). This is usually performed by bringing the target's resources to exhaustion (again, target resources may range from bandwidth to memory and CPU).

In greater detail, a DoS attack may consist in flooding a target network with hundreds of megabits of traffic (volume based DoS), exhausting a server state by opening a large number of TCP connections (SYN flooding), or by making an HTTP server unavailable by sending it an overwhelming number of requests. An attack may be more subtle and exploit well-known vulnerabilities in the target system (e.g. a large number of fragmented IP packets may exhaust the resources of a router).

Nowadays, DoS attacks are mostly distributed, i.e., they are carried out by multiple sources at the same time, thus making it more difficult to track. In many cases, botnets (i.e. armies or infected hosts spread across the network and under the control of a single master) are used for mounting DoS attacks. In addition, source addresses used for attacks can be spoofed, so that blocking an offending address is potentially useless.

In general, DoS attacks are easy to detect when they are brute-force, but, especially when highly distributed, they may be difficult to distinguish from a flash-crowd (i.e. an overload of the system due to many legitimate users accessing it at the same time).

Statistics and machine learning techniques have been proposed for detecting attacks at the server or network level. Some approaches try to analyze changes in the overall statistical behavior of the network traffic (e.g. the traffic distribution among flow flattens when a DDoS attack based on a number of microflows happens). Other approaches aim at statistically characterizing the normal behaviors of network flows or TCP connections, in order to detect significant deviations.

However, the Internet of Things (IoT) represents a completely different scenario and requires novel detection and reaction strategies. Its highly distributed nature implies that there is no central vantage point from which an attack can be observed. In addition, the scarce resources of the IoT force reporting from the nodes to a central location to be reduced to a minimum.

On top of the lack of global information, detecting DoS in the IoT is made harder by the fact that a much more subtle interference of the network's operations may be enough to bring the network down. For example, a jamming node can prevent a node from decoding traffic by just emitting short bursts when activity on the channel is detected. This can isolate a large portion of the network which uses that node as a parent and cut off a large portion of the network. In addition, in the case of battery operated nodes, a slow but steady flow of malicious traffic can exhaust a node's battery, thus making the node useless in a matter of days.

Due to the high variability of this kind of network, the symptoms of those attacks are not easy to detect and can be lost in the normal noise of the network behavior (traffic peaks and topology changes are quite normal in LLN). Therefore, an intelligent approach is needed that is able to reveal subtle changes in the measured data that are typical of a known anomalous behavior.

—Possible Attacks Against IoT—

Even though the existing literature regarding possible attack types against the IoT is limited, a number of attacks against sensor network technologies may apply with a few minor modifications. Such attacks can be roughly classified into two classes: 1.) insider attacks (i.e., where the malicious node needs to be authenticated and be in possession of the network encryption keys), and 2.) outsider attacks (i.e., where the attacker just needs to be within the radio range of the victims).

In particular, a number of attacks against routing performed by a malicious node in the DAG can be imagined. A node can, for example, perform selective forwarding. In other words, the node could just discard some of the traffic messages that it is asked to forward, while still participating correctly within the routing protocol. Although this can potentially be revealed by end-to-end mechanisms, detection of this type of attack can be difficult and slow due to the low traffic rate and lossiness of IoT networks. Other example attacks include a malicious node impersonating multiple identities or advertising forged routing information, so as to gain a central role in the routing topology.

While attacks belonging to the former class can be prevented through well-designed cryptography and authentication, in the latter case they have to be detected by monitoring the network environment.

The simplest form of attack that can be performed against an RF network is jamming. This consists in artificially creating an interference, so as to prevent message decoding. There are several variations of a jamming attack, with different degrees of complexity and subtlety. The attacker can continuously emit power on the spectrum (continuous jamming), create a collision when it detects activity on the channel (reactive jamming), or attack only a particular type of traffic (selective jamming). The damage from a jamming attack can be maximized if the attacker is able to estimate the centrality of a node in the routing topology. This can be obtained by accounting for the amount of traffic transmitted and received by each node, by leveraging the fact that the link layer addresses are in clear. Once the jammer has detected the most central node, it can try to make this node unreachable for its descendants, which will in turn be forced to select another parent. This can potentially create continuous route oscillations and convergences.

Other kinds of external DoS attacks can be performed by exploiting the fact that a number of messages in the WPAN do not need authentication, such as discovery beacons and some of the EAPoL messages used for authentication. In particular, discovery beacons can be used for injecting false synchronization information into the network, so as to prevent two nodes from meeting on the right unicast communication frequency. EAPoL authentication messages, instead, have to be relayed by the WPAN nodes up to the FAR, and from there until the AAA server. This mechanism allows an attacker to generate routable traffic, thus flooding the network and wasting bandwidth and processing power. A mitigation strategy may to have authentication requests be rate-limited. However this may result in legitimate nodes being prevented from authenticating when an attack is in progress.

Other attacks can be performed against networks that use the 802.11i protocol, which is used for exchanging key information between the authenticating node and the FAR (and therefore, cannot be protected by link layer encryption). Such attacks are documented in the scientific literature and aim at blocking the handshake between the client and the access point. This can be achieved by an attacker by interleaving a forged message between two messages in the handshake. This implicitly resets the handshake state, so that subsequent messages from the authenticating node are discarded.

—Frequency-Hopping and Synchronization in 802.15.4—

In a channel-hopping mesh network, devices communicate using different channels at different times. To communicate a packet, a transmitter-receiver pair must be configured to the same channel during packet transmission. For a transmitter to communicate with a receiver at an arbitrary time in the future, the transmitter and receiver must synchronize to a channel schedule that specifies what channel to communicate on and at what time. Channel schedules may be assigned to each transmitter-receiver pair independently so that neighboring transmitter-receiver pairs can communicate simultaneously on different channels. Such a strategy increases aggregate network capacity for unicast communication but is inefficient for broadcast communication. Alternatively, all devices in a network may synchronize with a single channel schedule such that all devices transmit and receive on the same channel at any time. Such a strategy increases efficiency for broadcast communication since a single transmission can reach an arbitrary number of neighbors, but decreases aggregate network capacity for unicast communication since neighboring individual transmitter-receiver pairs cannot communicate simultaneously without interfering. Mesh networks typically utilize both unicast and broadcast communication. Applications use unicast communication to communicate data to a central server (e.g. AMI meter reads) or configure individual devices from a central server (e.g. AMI meter read schedules). Network control protocols use unicast communication to estimate the quality of a link (e.g. RSSI and ETX), request configuration information (e.g. DHCPv6), and propagate routing information (e.g. RPL DAO messages). Applications use multicast communication for configuring entire groups efficiently (e.g. AMI meter configurations based on meter type), downloading firmware upgrades (e.g. to upgrade AMI meter software to a newer version), and for power outage notification. Network control protocols use multicast communication to discover neighbors (e.g. RPL DIO messages, DHCPv6 advertisements, and IPv6 Neighbor Solicitations) and disseminate routing information (e.g. RPL DIO messages). Existing systems optimize for both unicast and broadcast communication by synchronizing the entire network to the same channel-switching schedule and using a central coordinator to compute and configure channel schedules for each individual device, or else more efficiently optimizing for both unicast and broadcast communication in a channel-hopping network without need for centrally computing schedules for individual nodes.

In order to join the WPAN enabled with frequency hopping (e.g., an 802.15.4 WPAN), a node needs to synchronize on the frequency hopping schedule of its neighbors. Therefore, each node in the WPAN broadcasts its unicast reception schedule via a discovery beacon, which is not encrypted and sent on every frequency: this allows nodes joining the PAN to join. In greater detail, the discovery beacon message is sent a broadcast destination WPAN and includes several information elements, most notably:

* The WPAN SSID string
 * The unicast scheduling information. In one implementation, this is made up of a slot number and an offset value. This allows the receiving node to compute the slot number the sending node is currently is, and thus, by applying a hash function, to know its current receiving frequency. Note that this algorithm does not require the clocks of the two nodes to be synchronized.

The transmission of a discovery beacon is triggered by an associated trickle timer. However, the information about the scheduling of the broadcast slot is not included in such a beacon, but only in the synchronous and unicast beacons, which are encrypted with the network key. In particular, the synchronous beacon is triggered by a trickle timer and it is sent on every frequency (just as the discovery beacon). The unicast beacon, on the contrary, is sent upon request by another node by using a standard unicast transmission. In both cases, the beacon includes a broadcast scheduling information element, which has the same format of the unicast scheduling IE (Information Element). As a consequence, an attacker can interfere with its target during its unicast slot, but ignores the broadcast frequency schedule: the broadcast schedule is therefore much better protected against DoS attacks.

—802.15.4 Security—

Currently, IoT architecture comes with several embedded security mechanisms. The cornerstone of IoT security is indeed link layer encryption, which is mandatory for most frames (including routing messages and application traffic). Besides pure encryption, link layer security ensures message integrity (through an encrypted MAC code) and message non-replication (through an encrypted sequence number included in the encrypted message payload).

In order to install the necessary link layer keys on every node, an authentication procedure is carried out when the node joins the network. Such a procedure is based on the EAPOL protocol, which is carried directly over layer 2 messages and is used for transporting authentication data from the node to the FAR (notice that such messages are not encrypted). On top of EAPOL, two main protocols are carried: EAP messages, which the FAR tunnels to an AAA server through the RADIUS and 802.11i messages, which are used for exchanging cryptographic material between the FAR and the node.

In greater detail, EAP messages are used by the node for mutual authentication with the AAA server and securely agree on a shared secret; to this end, a complete TLS handshake is, in turn, tunneled over EAP messages and a public key mechanism based on X509 certificates is used for identity validation. Once such shared secret has been established, the AAA server transmits it to the FAR, which, in turn, uses it for exchanging the link layer keys with the node through the 802.11i protocol.

Notice that the shared secret negotiated through EAP is stored by the node in persistent memory and can be reused for subsequent authentication (in this case, EAP is skipped and the link layer key is directly exchanged through 802.11i).

Anomaly Detection in a Computer Network

As noted above, detecting DoS attacks in LLNs faces a number of challenges. The resources of embedded nodes are extremely limited in terms of processing power, memory and battery life. The amount of available bandwidth for transmitting monitoring data to a centralized location is also extremely scarce in a typical LLN.

Distributed architectures for detecting DoS attacks using LMs have been proposed. However, those solutions need a number of components both on the end nodes and on the FAR hosting the LM. In addition, these approaches also need the capability of collecting data when the network is under attack. In some cases, such as in highly constrained networks (e.g., LLNs, etc.), this collection may not be possible. For example, the nodes in an LLN may not have enough processing power and bandwidth to handle such a request, the nodes may be battery operated (i.e., the nodes may have limited power reserves), the detection infrastructure components may not be deployed on the FAR, or it may not be possible to collect a dataset in the network when attack conditions are present. Accordingly, a lightweight DoS detection mechanism is provided herein that does not rely on the intervention of a central component. By leveraging such a mechanism, a node can independently decide that a DoS attack is in progress and, in some cases, the node can choose to adopt local countermeasures (e.g., by employing a quarantine-based approach, which allows the node to avoid publishing its synchronization information for example in the case of 802.15.4 using frequency hopping whenever an attack is detected). The lightweight DoS detection mechanism herein may also be used in conjunction with other distributed DoS (DDoS) attack detection mechanisms.

In particular, the techniques herein provide a methodology for locally detecting DoS attacks at a network node/device by leveraging the consistency between statistics collected regarding the device's broadcast and unicast communication slots, according to various embodiments. As noted above, the broadcast schedule information of a network node using the 802.15.4 link layer is only available to the authenticated nodes, while the schedule of the unicast slot is published in the clear. In such a case, one potential DoS attack may involve using signal jamming, which is a frequent type of DoS attack, during the unicast slot. The unicast slot may be an easier target for an attack because it would be much harder to correctly synchronize with the broadcast slot, unless a brute force approach is used. For example, an attacker may perform a brute force attack by keeping a receiver tuned on each possible frequency or continuously jamming the whole spectrum. Both of these types of attacks would be easy to detect, as opposed to a more targeted attack on the unicast slot. The techniques herein also provide a completely distributed methodology for aggregating statistics collected by a set of nodes in the network. This allows for the aggregations of observations coming from a number of sources, thus capturing a larger variability in network behavior. While the techniques herein may be implemented as a standalone solution, the techniques may also be integrated within a layered cooperative solution, in further embodiments.

Said differently, the techniques herein provide a lightweight and completely distributed mechanism for detecting DoS attacks against LLNs. The techniques leverage the consistency between the statistics collected in the unicast slot and those collected in the broadcast slot (e.g., whose scheduling is encrypted). The techniques may use in-band and out-of-band network aggregation in order to compute a Gaussian model of the reception success rates in the two different types of slots. The techniques also provide a mechanism for detecting when the computed global Gaussian model is too general for subset of nodes in outlier network conditions. In such a case, the nodes can trigger a model re-computation that only involves the subset of the network nodes.

Specifically, in one or more embodiments, a training request is sent to a plurality of nodes in a network to cause the nodes to generate statistics regarding unicast and broadcast message reception rates associated with the nodes. The statistics are received from the nodes and a statistical model is generated using the received statistics and is configured to detect a network attack by comparing unicast and broadcast message reception statistics. The statistical model is then provided to the nodes and an indication that a network attack was detected by a particular node is received from the particular node.

Operationally, as shown in, and with general reference to, FIGS. 4A-8, the techniques herein provide a local DoS detection mechanism that can be enabled on a highly constrained network node, such as a node of an LLN. Such a mechanism leverages the consistency between the statistics observed by a node within a broadcast slot (i.e., where attacks are hard to perform, since the frequency hopping information is encrypted) and within the unicast slot (i.e., whose frequency hopping information is broadcasted in clear) using the RF link layer of choice in LLNs, namely IEEE 802.15.4. While the techniques herein are described primarily with reference to 802.15.4 communications, it is to be appreciated that the techniques can be easily adapted to other situations and network protocols. In contrast to approaches that offload the most intensive operations to external entities (e.g., LM training), the techniques herein carry out both training and detection within the LLN itself. Thus, the mathematical models used herein are significantly lighter in terms of training and detection. In addition, approaches that use LMs for classification require training data from when an attack is present in the network (i.e., to detect when a particular type of attack exists). The techniques herein, however, use an anomaly detection approach that only requires data regarding the normal behavior of the network.

In some embodiments, the techniques herein illustratively use a Gaussian model, which is particularly suitable for use in constrained networks, since training the model reduces to computing of a set of simple statistics (e.g., mean, variance, and covariance) while detection only requires the computation of a function. In one embodiment, a multivariate Gaussian distribution may be used to detect an ongoing DoS attack. In particular, the two variables U and B will represent the successful reception rate in a unicast and multicast slot respectively. Those variables will be considered as jointly Gaussian which means that the distribution of the observations of U and B approximately follows a 2-dimensional Gaussian distribution. This means that such a distribution captures not only the individual behaviors of the two variables, but also the relationship between the behaviors of the two variables. In greater detail, the statistical behaviors may be completely characterized by the mean vector and the variance-covariance matrix. The mean vector represents the coordinates of the center of the distribution, while the covariance matrix determines the shape of the distribution.

The techniques herein use the following notation:

$U_i$ and $B_i$ will represent the $i^{th}$ sample of success rate in the unicast and in the broadcast slots, respectively.

$M_u$ and $M_b$ will represent the mean of the unicast and broadcast success rate respectively.

$S_u$ and $S_b$ will represent the variance of the unicast and broadcast success rate respectively.

$Cov_{ub}$ will represent the covariance of the two random variables.

The knowledge of such variables will be sufficient for characterizing the Gaussian distribution. Each of these statistics can, in practice, be derived as empirical means of simple functions of the local observations:

$$M_u = (U_1 + U_2 + \ldots + U_N)/N = SUM_i(U_i)/N$$

$$M_b = (B_1 + B_2 + \ldots + B_N)/N = SUM_i(B_i)/N$$

$$S_u = (U_1^2 + U_2^2 + \ldots U_N^2)/N - M_u^2 = SUM_i(U_i^2)/N - M_u^2$$

$$S_b = (B_1^2 + B_2^2 + \ldots + B_N^2)/N - M_B^2 = SUM_i(B_i^2)/N - M_b^2$$

$$Cov_{ub} = (U_1*B_1 + U_2*B_2 + \ldots + U_N*B_N)/N - M_u*M_b = SUM_i(U_i*B_i)/N - M_u*M_b$$

Each of the above expressions can be easily updated with new samples of $U_i$ and $B_i$ just by keeping a track of the number of samples previously used. For instance, $M_u$ can be updated as follows:

$$M_{u\_new} = (M_{uold}*N_{old} + U_{1new} + U_{2new} + \ldots + U_{Nnew})/(N_{old} + N_{new})$$

This also applies for the aggregation of statistics generated by two different nodes. Assume, for instance, two sample sets issued by nodes n and m. Then, the mean value of is the union of these two sets can be expressed as:

$$M_{u\_n,m} = (M_{u\_n}*N_n + M_{u\_m}*N_m)/(N_n + N_m)$$

Thus, it is enough for each of the nodes to export the sum of their samples and the number of samples in the sum, to allow an aggregator to compute the aggregated statistics without information loss.

The first aspect of the techniques herein is a methodology for training a Gaussian model in a completely distributed way. The training phase may be initiated by a network management system (NMS) or other device, by sending a multicast message to the entire WPAN (e.g., a collection request message), thereby triggering data collection on every node. Notice that it is the network administrator's responsibility, in this case, to guarantee that no attacks are taking place when training is performed. To that end, the techniques herein specify a newly defined Multicast IPv6 message called Coll_Req that may include any or all of the following information:

1.) The number of samples to be collected

2.) A maximum collection time limit when aggregation will be triggered, regardless of the number of received samples 3.) (Optionally) The ID (e.g., IPv6 address) of the aggregator 4.) (Optionally) the ID (e.g., IPv6 address) of the computing entity in charge of processing the aggregates and computing the classifier In one embodiment, the Coll_Req message is broadcast at the link-layer using a protocol such a trickle multicast, as specified in the Internet Draft Protocol "Multicast Protocol for Low Power and Lossy Networks (MPL)" by J. Hui et al. (August 2013) (draft-ietf-roll-trickle-mcast).

In the techniques herein, multiple models are specified: although the collection of statistics specified above may take place on all nodes, the aggregation of samples may take place along specific nodes along the computed routing topology (e.g., parents that have enough processing power and at least N number of children) or at a dedicated node referred to as an aggregator (e.g., a node in the network, which could also be the NMS). Similarly the processing of the statistics to compute the classifier may take place on a node in the LLN, the Field Area Router, or the NMS. In other words, the described architecture is entirely flexible and any network node can aggregate data and/or compute a classifier.

Figure 4A:
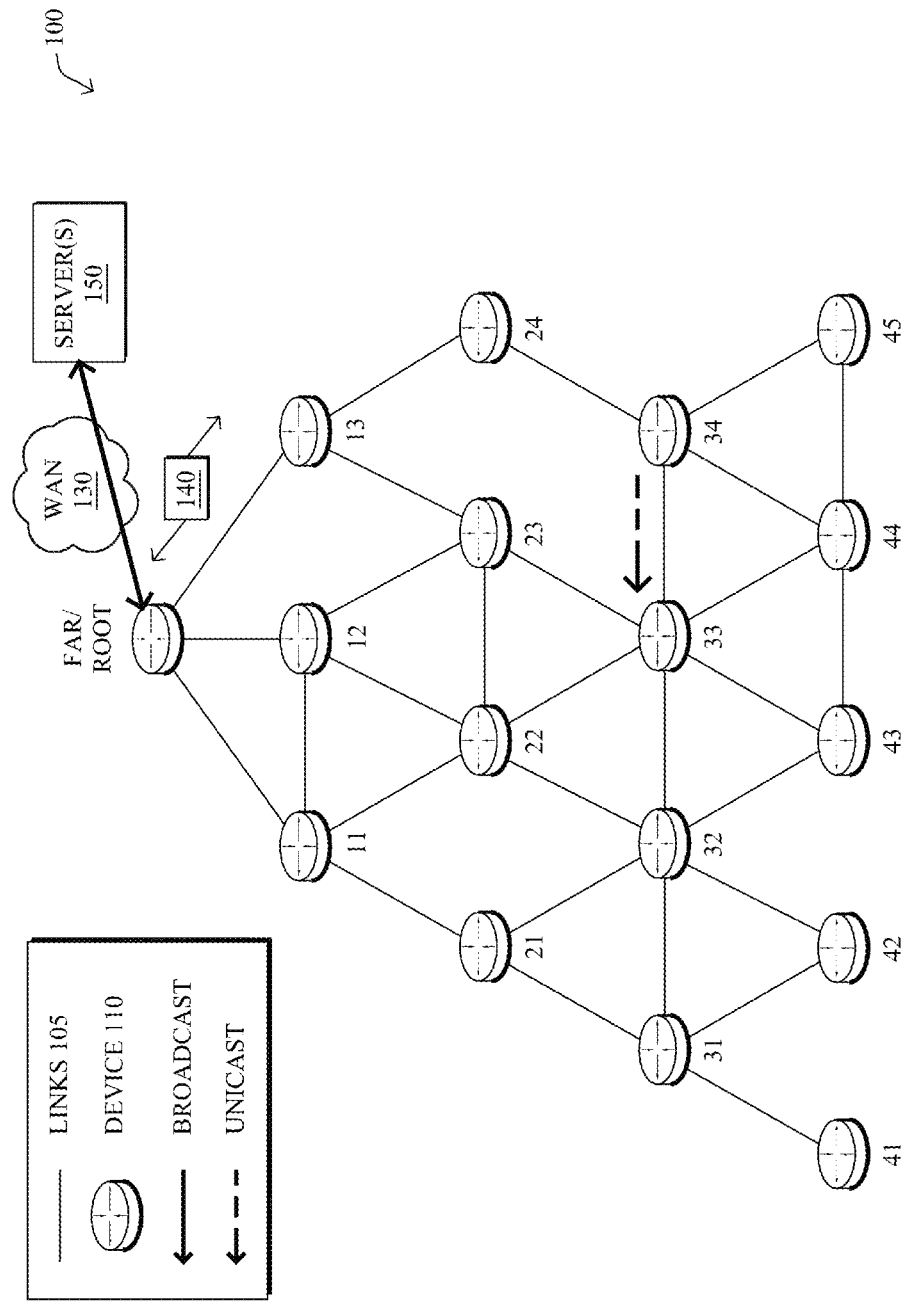
FIG. 4A illustrates an example of a network node sending a unicast message.
Figure 4B:
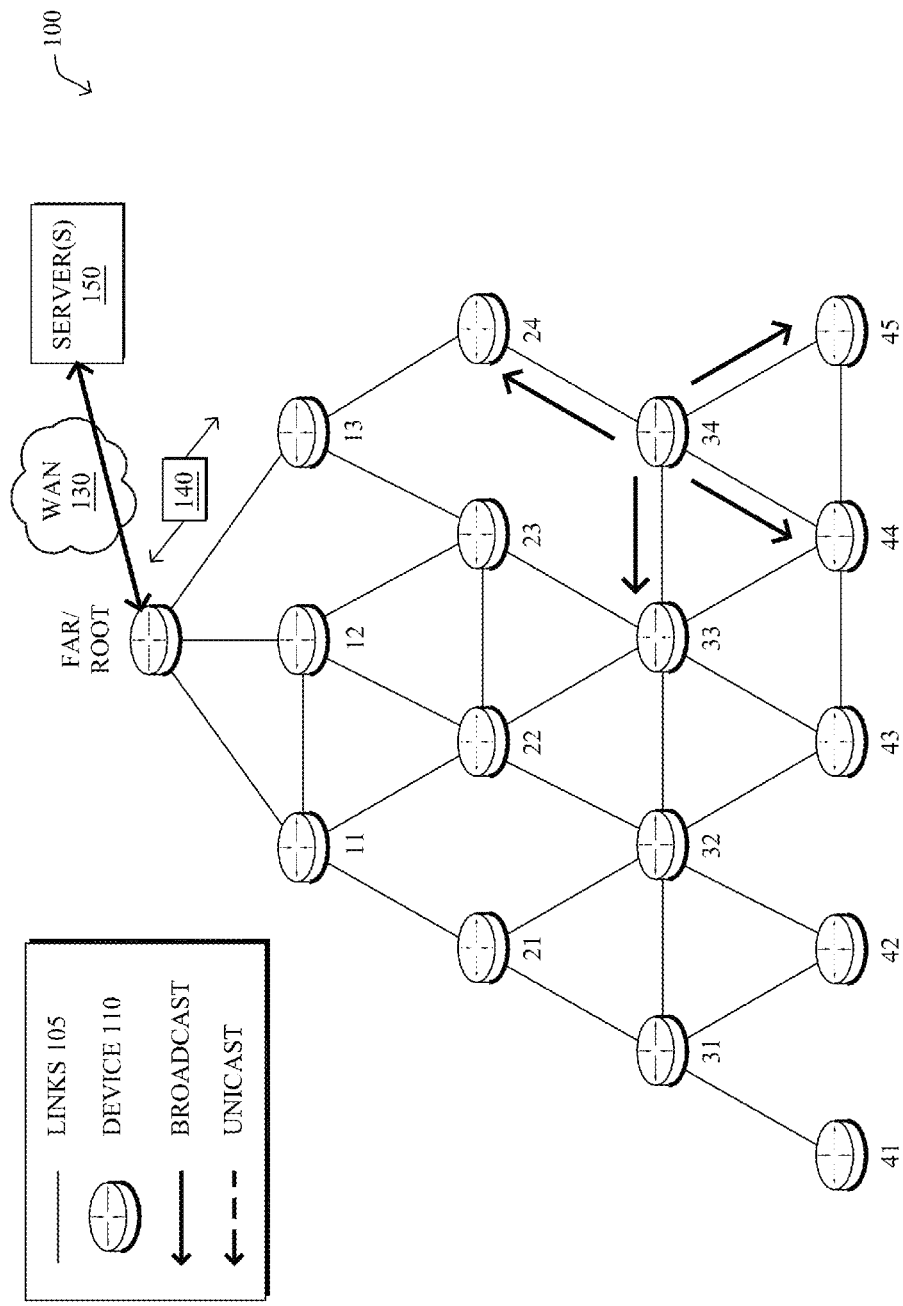
FIG. 4B illustrates an example of a network node sending a multicast message.

Upon reception of a collection request message, every node will begin collecting samples and updating the statistics detailed above (e.g., $M_u$, $M_b$, etc.). For each of the partial sums associated with one of the above statistics, the node may increase both the accumulation and the number of samples. In particular, each sequence of a unicast period followed by a broadcast slot will generate a number of samples (i.e., sets U, B). For example, as shown in FIG. 4A, a node 34 may send unicast messages to its neighbors, to collect sample data regarding the success rate of its unicast slot (e.g., based on acknowledged messages). Similarly, as shown in FIG. 4B, node 34 may broadcast messages to its neighbors, to collect sample data regarding the success rate of its broadcast slot (e.g., based on acknowledged messages).

Once the number of samples specified in the collection request message has been collected or the collecting period specified in such message has expired, then a node will issue a statistics report message, after the expiration of a random timer to avoid nodes sending an avalanche of reports to the NMS or aggregator. In one embodiment, the statistics report message may be sent after the expiration of a small random timer, to avoid the collisions of reports and is small enough to allow for aggregation along the DAG. Such a message will contain the statistics characterizing the observed distribution of B and U by the node. In particular, as specified for each of the statistics discussed above, the following partial sums, along with the number of samples, may be exported as part of the statistics report message:

$SUM_i(U_i)$
$SUM_i(B_i)$
$SUM_i(B_i*U_i)$
$SUM_i(B_i^2)$
$SUM_i(U_i^2)$

In some cases, the statistics report message also includes a Bloom Filter which will be used in the following stages of aggregation for keeping track of which nodes contributed to the aggregated information. If no aggregation has been performed yet, only the node issuing the message is included in the set associated to the Bloom filter. The statistics report message will be then sent to the aggregator, which may be the direct parent if no aggregator is specified in the Call_Req message or the specified aggregator otherwise.

A second aspect of the techniques herein involves aggregating the previously collected statistics and computing a model for anomaly detection, such as a Gaussian model. If aggregation takes place along the DAG, each node in the DAG may wait until it receives a statistics report message from each of its children, before reporting its statistics report. In addition, the node may utilize an export timer to control when the node communicates its statistics report. Such a timer may, in one embodiment, have a duration that is computed as the value of the collection duration limit plus a value which is inversely proportional to the node's rank in the tree. Doing so ensures that lower ranked nodes (i.e., those nodes closer to the network root) will wait longer before performing aggregation. When such a timer expires, aggregation is triggered even if some of the node's children have not yet sent their reports to the node. In either case, the node aggregates the statistics received with the statistics collected from the node's local dataset. In greater detail, for each statistic, a given node node merges both the partial sum and the number of samples associated with each data set. The aggregator may also merge the Bloom filters received by the contributing nodes (e.g., by performing a bitwise-OR) and adds its own identifier to the bloom filter in the aggregated message. Of note in this design is that that the amount of information at each level of the tree is constant.

In another embodiment of the techniques herein, each node sends its statistics report directly to the specified aggregator (e.g., a node such as a controller, the NMS, etc.) that aggregates the data from the whole WPAN. In this case, the aggregator can check the Bloom Filter against the network topology and detect whether relevant areas of the LLN have not reported statistics. In this case, the aggregator may request that a new statistics collection be performed by resending a Coll_Req message to the nodes. In case of distributed aggregation along the DAG, the Bloom Filter may be replaced with a counter, and the top-most node will check that data from a sufficient number of nodes has been collected.

Aggregation may proceed recursively until the statistics reach the topmost node in the DAG (e.g., this may be the FAR itself). Once such a node finished performing aggregation, it will be able to compute the global statistics for the aggregated dataset collected by all of the nodes participating to this mechanism. For instance, after receiving $SUM_i(U_i)$, and the number of elements in these sums from the node's children, the node will be able to compute $M_u$ of the aggregation using all the samples from the children nodes and its own local samples.

Figure 5C:
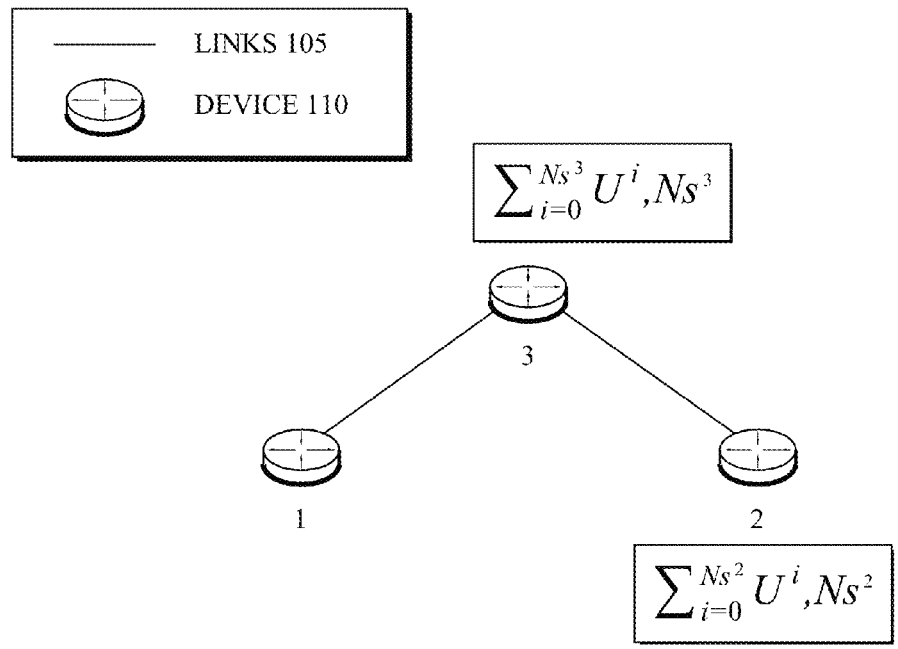
Figure 5D:
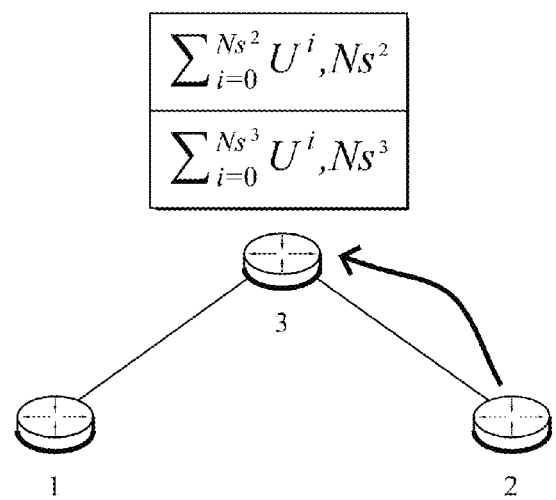
Figure 5E:
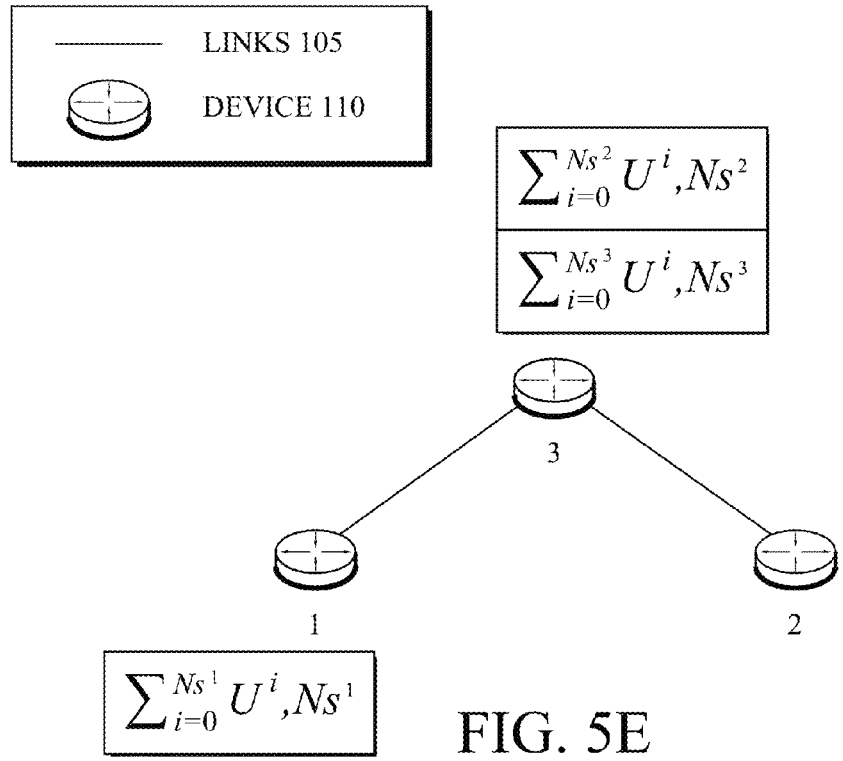
Figure 5F:
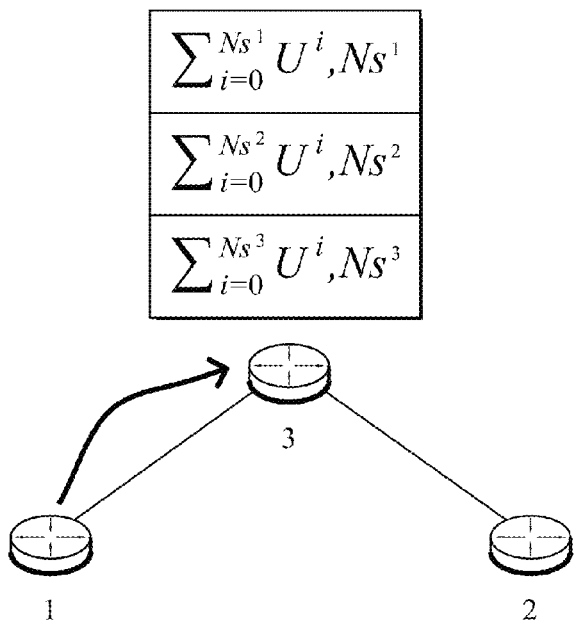

FIGS. 5A-5F illustrate an example of network statistics being aggregated. In a simplified example, statistics from three nodes (i.e., nodes 1-3) are aggregated, to compute the mean variable U from the aggregated dataset. In FIG. 5A, assume that node 3 has been selected as an aggregator for nodes 1 and 2. During a data collection phase, each of nodes 1-3 collects samples regarding their respective unicast and broadcast slots. After the collection phase, each of nodes 1-3 computes the sum of its observed samples, along with the number of samples. For example, as shown in FIG. 5B, node 3 may compute the sum of its observed samples. Similarly, as shown in FIG. 5C, node 2 may compute its own sum using its locally collected sample data. After each of nodes 1-2 computes its local statistics, nodes 1-2 report their local statistics to node 3. For example, as shown in FIG. 5D, node 2 reports its statistics to node 3 (i.e., the sum of its successful unicast messages and its overall total number of unicast messages). At this point, node 3 has both its locally generated statistics and the statistics generated by node 2. This process is repeated between node 1 and node 3, as shown in FIGS. 5E-5F. Thus, node 3 now has the locally generated statistics from all three nodes and may perform aggregation on the statistics. For example, node 3 may combine the received statistics to compute the mean of the whole dataset as follows:

$$\frac{\sum_{i=0}^{Ns^1} U^i + \sum_{i=0}^{Ns^3} U^i + \sum_{i=0}^{Ns^3} U^i}{Ns^1 + Ns^2 + Ns^3}$$

Notably, this mechanism works without information loss and with no additional state, besides the counters mentioned above. As will be appreciated, the example mechanism can be extended to all of the other statistics described above (e.g., means, variances, covariances, etc.).

—Computation of the Classifier—

Figure 6:
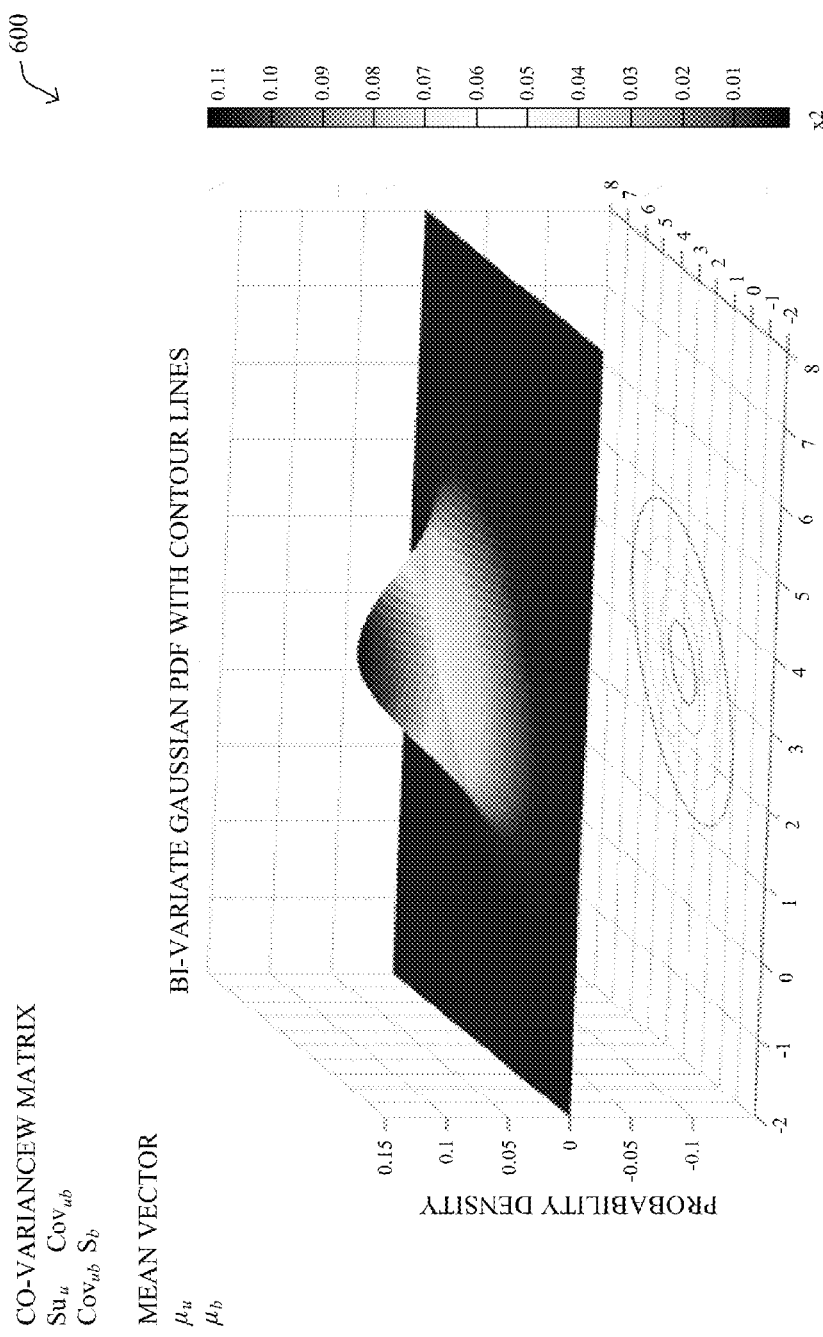
FIG. 6 illustrates an example bi-variate probability density function.

Once the statistics have been collected and aggregated, the statistics are processed by a computing entity/node to compute the statistical model. The computing entity may be the same node or may differ from the node in charge of gathering and aggregating the statistics. In one embodiment, t computing entity makes use of a newly defined multicast IPv6 messaged called the Classif( ) message that is broadcasted and carries out a classifier description message containing the complete characterization of a bivariate Gaussian model (i.e., the already recalled necessary statistics) to be used for detection. In addition, the message may include the density value threshold that will be used for deciding whether or not to trigger an alarm. For example, as shown in FIG. 6, the aggregated statistics define the size and shape of a Gaussian distribution 600, i.e., the mean vector represents the coordinates of the center of the distribution, the covariance matrix determines the shape of the distribution, etc. Each node will install such a statistical model (e.g., a statistical classifier) and enter the detection and reaction phase.

Figure 7:
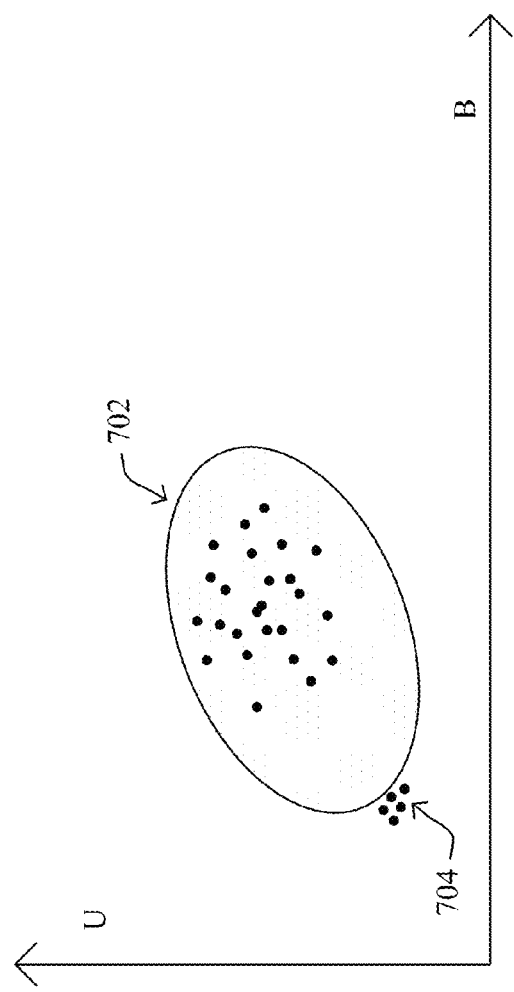
FIG. 7 illustrates an example of the detection of an anomalous network condition.

As shown in FIG. 7, the regions of a bivariate Gaussian model with the same density value define ellipses in the 2-dimensional space. The volume inside the ellipse 702 of the bivariate Gaussian function gives the probability of this region. In various embodiments, a density value threshold may be used as part of the statistical model to define how "far" a sample can be from the peak of the Gaussian distribution without being considered an anomalous point (e.g., without triggering an alarm). In other words, such a threshold can be set to a value such that the probability of one sample of the Gaussian distribution falling within the anomalous region equals a target probability (e.g., a reasonable choice may be 99.999%). Therefore, a density value lower than the threshold means that the observation is too far from the common behavior and an alarm may be raised. For example, data points 704 may be outside of the density value threshold and deemed to be network anomalies (e.g., such as when an attack is present).

After receiving the details of the Gaussian or other statistical model, each node may continue to compute the success rate in both its broadcast/multicast and unicast slots. For each sample ($U_i$, $B_i$), the node will compute its likelihood with respect to the installed Gaussian model. If the likelihood of the tuple of success ratios is lower than the installed threshold, different behaviors can be adopted.

In one embodiment a mitigation mechanism can be triggered. In another embodiment, the node can multicast an alarm to its neighbors at the physical layer, in order to confirm the detection. In yet another embodiment, the node will trigger a hierarchical classifier method. In particular, the node will send an alarm to the FAR, which, in turn, will send back a proper message for installing a first level (weak) classifier.

In yet another embodiment, nodes may also broadcast/multicast their local statistic summary to other nodes in the vicinity (i.e., neighboring nodes) while potentially controlling the vicinity with a radius. Upon receiving statistic from other nodes, each node then computes its local classifier. Although less data is accumulated in comparison to other techniques described above, such a classifier will also be less accurate and may be used in specific environments.

The final aspect of the techniques herein relates to a methodology for avoiding overgeneralization of the statistical model. Training a statistical model, such as a Gaussian model, on the whole dataset observed by the nodes allows the model to capture more variability. However, doing so may also lead to bad performance, in some cases. For instance, bad performance may result when multimodality is present in the sample set, which cannot be captured by a Gaussian distribution. This is due to the fact that the order of the model is fixed as opposed, for example, to an ANN that can capture data complexity by adding more neurons to its hidden layer. This means that nodes constituting outliers with respect to the standard behaviors may come across as anomalies with respect to the average behavior. For example, if a small subset of nodes observes a very bad physical channel, they will show very low success rates in both the unicast and broadcast slots. A Gaussian model computed over the whole network may classify such a behavior as an anomaly if the number of samples corresponding to this behavior is much lower than the number of samples for other behaviors.

Referring again to the example in FIG. 7, assume that samples 704 represent a subset of nodes in a network region with bad channel conditions and are detected by the Gaussian model as an outlier/anomaly. In greater detail, nodes observing a bad channel typically exhibit low success rates both in the broadcast and the unicast slot. Indeed, the presence of these samples shifts the overall mean and increases the variance of the model, but this is not enough for avoiding their classification as outliers.

In some cases, a more specialized statistical model may be computed for a specific subset of nodes. Since there is no central entity responsible for training the model, the techniques herein propose a distributed and lightweight mechanism for generating a specialized statistical model. In particular, once the global model has been installed, the nodes can check the ratio of samples flagged as anomalous by the model. It is again assumed that no attack is taking place during the training phase and, therefore, those detections can be considered to be false positives. If the number of false positives exceeds a configurable threshold, then a node may send to its parent a model re-computation request message.

If a parent node receives a re-computation alert from a configurable portion of its children, the parent node may in turn escalate and send a re-computation alert to its own parent. The procedure will escalate recursively towards the root of the tree and will only stop whenever a parent node receives a number of re-computation alerts that stays below the threshold. In this case, the parent node will send a re-computation request message to the children nodes that sent the reconfiguration alert. The re-computation request will be propagated towards the bottom of the tree, and the nodes receiving it will start over from the data collection phase detailed above. In other words, the data will be collected again since the emerging of false positives may stem from a change in the statistic nature of the observed behavior. Data collection and aggregation will then be performed again only by the subset of nodes which raised the re-computation alarm.

In another embodiment of the techniques herein, nodes may send their re-computation alerts directly to the specified aggregator (e.g., a node such as a controller, or the NMS). The aggregator may then compute clusters of nodes in close proximity that are observing and/or demonstrating anomalies. The aggregator may then send a re-computation request message to the groups (e.g., using unicast, multicast, etc.).

Figure 8:
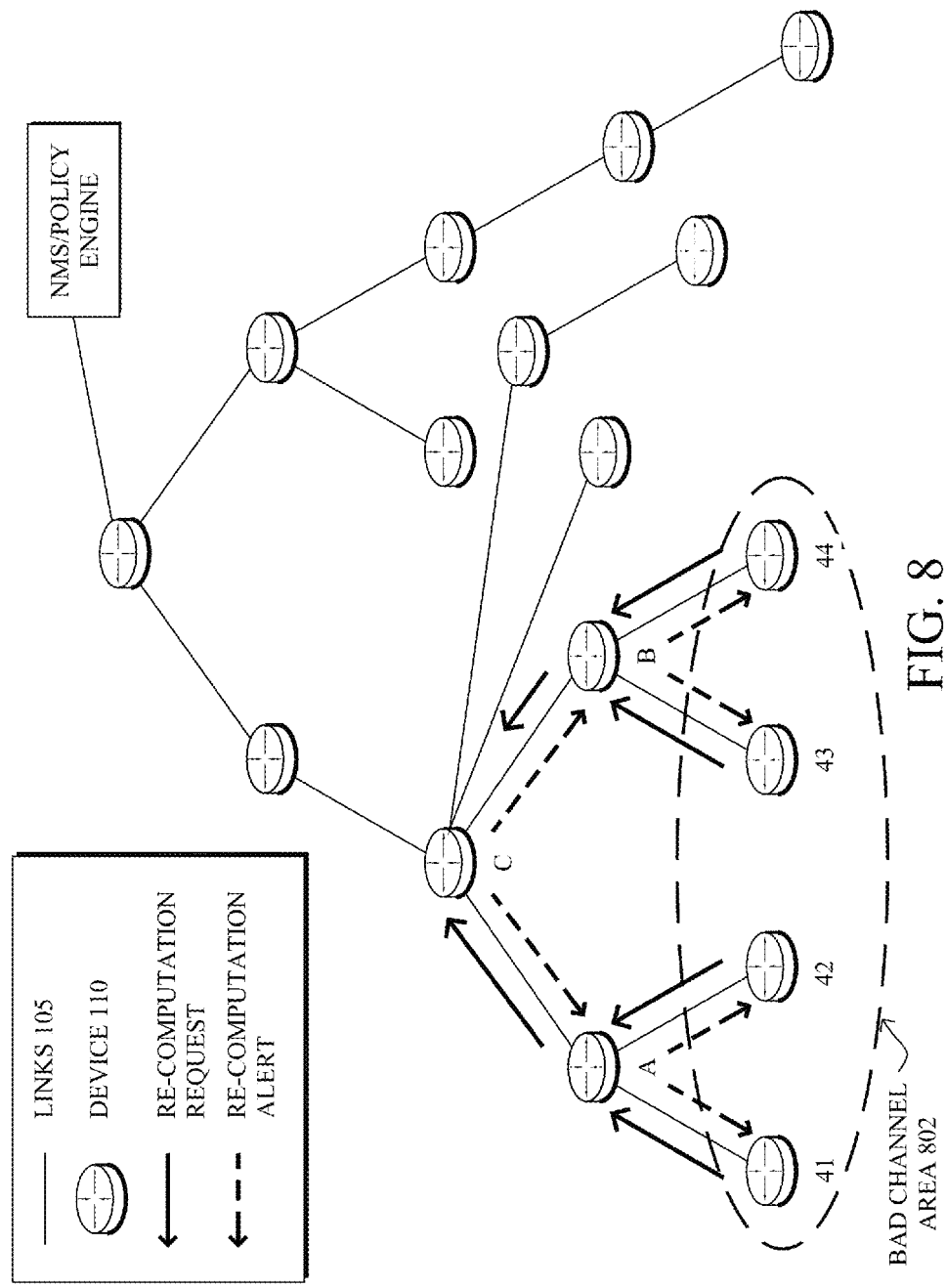
FIG. 8 illustrates an example re-computation request being sent.

FIG. 8 depicts the behavior of the mechanism where a subset of network nodes request re-computation of their statistical models. For example, the above-mentioned threshold may be set to 0.6 (i.e. the re-computation alerts are propagated only if more than 60% of the sons of a node sent an alert). In this particular case, a subset of nodes (i.e., nodes 41-44 in bad channel area 802) are experiencing bad channel conditions and witnessing a too high false positive rate. All of the nodes in area 802 then send re-computation alerts, which is propagated by intermediate nodes A and B (i.e., all of their children have sent an alert). Propagation is then blocked by node C, since only 50% of its children nodes sent the alert, which initiates the re-computation phase. The re-computation request will then propagate through the whole subtree, thereby causing the nodes under node C to re-compute a statistical model.

Figure 9:
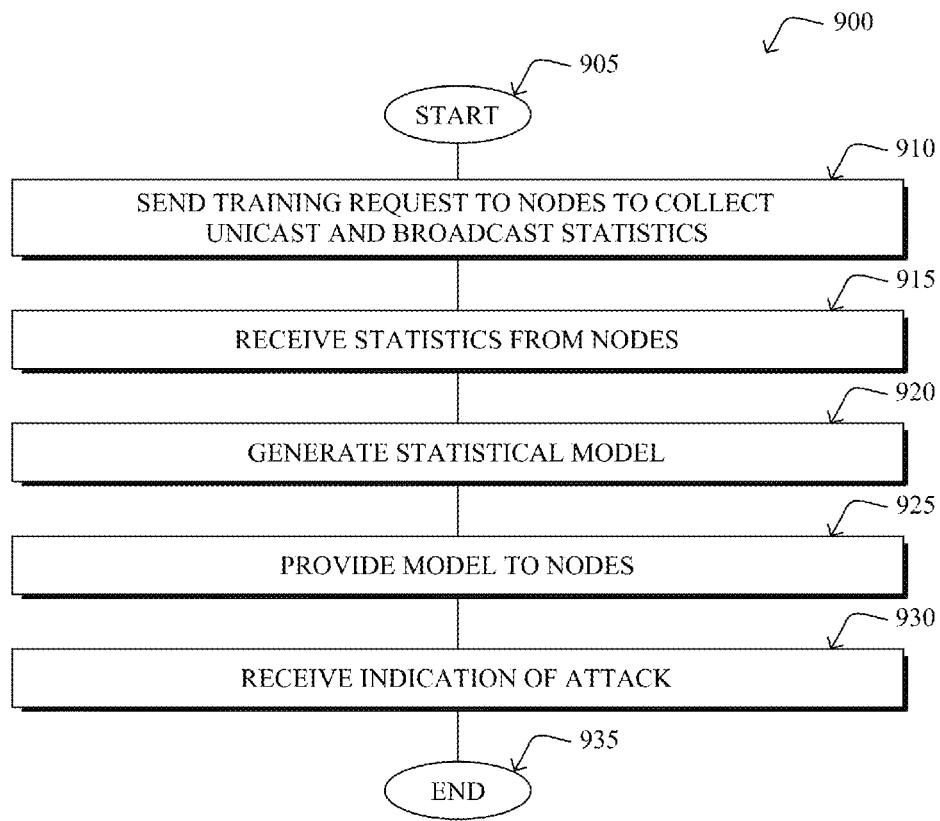
FIG. 9 illustrates an example simplified procedure for detecting an anomaly in a computer network.

FIG. 9 illustrates an example simplified procedure for detecting an anomaly in a computer network, such as an LLN, in accordance with one or more embodiments herein. Procedure 900 begins at step 905 and proceeds to step 910 in which, as described above in more detail, a training request is sent to one or more network nodes to collect unicast and broadcast statistics. Such statistics may, for example, relate to the successful transmission rates observed by the nodes via their respective unicast and broadcast communication slots. In step 915, the statics generated by the nodes are received and, in step 920, a statistical model is generated. As highlighted above, such a statistical model may be a Gaussian classifier or other model configured to detect a network anomaly using the received statistics. In step 925, the statistical model is then sent to the nodes, allowing the nodes to detect an anomalous network condition, such as a network attack. In step 930, an indication of a detected attack is received from one of the nodes and procedure 900 ends at step 935.

It should be noted that while certain steps within procedure 900 may be optional as described above, the steps shown in FIG. 9 are merely examples for illustration, and certain steps may be included or excluded as desired.

Illustratively, each of the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

The techniques described herein, therefore, provide for a distributed lightweight LM-based approach for anomaly detection. In particular, the techniques herein allow DoS detection to be performed with minimal computing and bandwidth requirements. In addition, the disclosed techniques require minimal support from a FAR or NMS, besides simple configuration and management. The techniques, thus provide a very lightweight and easy to deploy solution for DoS attack detection in LLNs.

While there have been shown and described illustrative embodiments that provide for computer network anomaly training and detection using artificial neural networks, generally, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   sending a training request to a plurality of nodes in a network, wherein the training request causes the nodes to generate statistics regarding unicast and broadcast message reception rates associated with the nodes;
   receiving the statistics from the nodes;
   generating a statistical model using the received statistics, wherein the statistical model is configured to detect a network attack by comparing unicast and broadcast message reception rate statistics;
   providing the statistical model to the nodes; and
   receiving, from a particular node, an indication that a network attack was detected by the particular node.

2. The method as in claim 1, wherein the statistical model is a Gaussian model.

3. The method as in claim 1, wherein the statistical model detects a network attack by determining that a difference between the unicast and broadcast message reception statistics exceeds a threshold amount.

4. The method as in claim 1, further comprising:
   determining that the network attack detected by the particular node was a false positive; and
   sending a notification to the particular node that the detected attack was a false positive.

5. The method as in claim 4, further comprising:
   receiving, from the particular node, a re-computation request that was sent based on a determination that a percentage of false positives generated by the particular node exceeds a threshold amount; and
   instructing a portion of the plurality of nodes that includes the particular node to generate a new statistical model.

6. The method as in claim 1, wherein nodes in the plurality send the generated statistics to a data aggregator that aggregates the statistics and sends the aggregated statistics to a network manager.

7. The method as in claim 1, wherein the particular node that detected the network attack broadcasts the indication to other nodes in the plurality.

8. The method as in claim 1, further comprising:
   sending a low precision machine learning model to one or more of the nodes in the plurality in response to receiving the indication of the detected network attack.

9. The method as in claim 1, wherein the statistics are broadcast from a node in the plurality to neighboring nodes within a radius, and wherein each of the neighboring nodes computes a local statistical model using the broadcast statistics.

10. An apparatus, comprising:
    one or more network interfaces to communicate in a computer network;
    a processor coupled to the network interfaces and configured to execute one or more processes; and
    a memory configured to store a process executable by the processor, the process when executed operable to:
      send a training request to a plurality of nodes in a network, wherein the training request causes the nodes to generate statistics regarding unicast and broadcast message reception rates associated with the nodes;
      receive the statistics from the nodes;
      generate a statistical model using the received statistics, wherein the statistical model is configured to detect a network attack by comparing unicast and broadcast message reception rate statistics;
      provide the statistical model to the nodes; and
      receive, from a particular node, an indication that a network attack was detected by the particular node.

11. The apparatus as in claim 10, wherein the statistical model is a Gaussian model.

12. The apparatus as in claim 10, wherein the statistical model detects a network attack by determining that a difference between the unicast and broadcast message reception statistics exceeds a threshold amount.

13. The apparatus as in claim 10, wherein the process when executed is operable to:
    determine that the network attack detected by the particular node was a false positive; and
    send a notification to the particular node that the detected attack was a false positive.

14. The apparatus as in claim 13, wherein the process when executed is operable to:
    receive, from the particular node, a re-computation request that was sent based on a determination that a percentage of false positives generated by the particular node exceeds a threshold amount; and
    instruct a portion of the plurality of nodes that includes the particular node to generate a new statistical model.

15. The apparatus as in claim 10, wherein the node that detected the network attack broadcasts the indication to other nodes in the plurality.

16. The apparatus as in claim 10, wherein the statistics are broadcast from a node in the plurality to neighboring nodes within a radius, and wherein each of the neighboring nodes computes a local statistical model using the broadcast statistics.

17. The apparatus as in claim 10, wherein nodes in the plurality send the generated statistics to a data aggregator that aggregates the statistics and sends the aggregated statistics to a network manager.

18. A tangible, non-transitory, computer-readable media having software encoded thereon, the software when executed by a processor operable to:
- send a training request to a plurality of nodes in a network, wherein the training request causes the nodes to generate statistics regarding unicast and broadcast message reception rates associated with the nodes;
- receive the statistics from the nodes;
- generate a statistical model using the received statistics, wherein the statistical model is configured to detect a network attack by comparing unicast and broadcast message reception rate statistics;
- provide the statistical model to the nodes; and
- receive, from a particular node, an indication that a network attack was detected by the particular node.

19. The computer-readable media of claim 18, wherein the statistical model is a Gaussian model.

20. The computer-readable media of claim 18, wherein the statistical model detects a network attack by determining that a difference between the unicast and broadcast message reception statistics exceeds a threshold amount.

\* \* \* \* \*